United States Patent
Schoenherr et al.

(10) Patent No.: US 6,318,510 B1
(45) Date of Patent: Nov. 20, 2001

(54) ELECTRONICALLY CONTROLLED VENTILATION SYSTEM FOR A DISK BRAKE

(75) Inventors: Armin Schoenherr, Oberau; Walter Kuffner, Munich, both of (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/382,192

(22) Filed: Aug. 23, 1999

(30) Foreign Application Priority Data

Aug. 21, 1998 (DE) ............................................. 198 38 116

(51) Int. Cl.⁷ .............................. F16D 55/02; F16D 65/78
(52) U.S. Cl. ....................................... 188/71.6; 188/264 R
(58) Field of Search ........................... 188/264 A, 264 R, 188/264 AA, 26, 71.6

(56) References Cited

U.S. PATENT DOCUMENTS

| | | | |
|---|---|---|---|
| 3,366,203 | * | 1/1968 | Dean .................................... 188/264 A |
| 3,491,856 | * | 1/1970 | Dean .................................... 188/264 A |
| 5,121,818 | * | 6/1992 | McComic ........................ 188/264 AA |
| 5,317,880 | * | 6/1994 | Spears ................................. 188/264 A |

FOREIGN PATENT DOCUMENTS

| | | | |
|---|---|---|---|
| 38 13 972 | | 11/1988 | (DE) . |
| 38 16 415 | | 11/1989 | (DE) . |
| 38 34 119 | | 4/1990 | (DE) . |
| 41 38 464 | | 6/1993 | (DE) . |
| 42 43 988 | | 6/1994 | (DE) . |
| 2 269 144 | * | 7/1992 | (GB) ................................. 188/264 R |
| 63-266229 | * | 11/1988 | (JP) ................................. 188/264 R |
| 3-125656 | * | 5/1991 | (JP) ................................. 188/264 R |
| 895-758 | * | 10/1978 | (SU) ................................. 188/264 R |

OTHER PUBLICATIONS

Japanese Abstract No. 62-200040, M-669, Feb. 19, 1998, vol. 12/No. 55.

* cited by examiner

*Primary Examiner*—Douglas C. Butler
*Assistant Examiner*—Thomas J. Williams
(74) *Attorney, Agent, or Firm*—Crowell & Moring LLP

(57) ABSTRACT

An electronically controlled ventilation system for a disk brake is provided, particularly in the case of a vehicle, in which a brake disk to be ventilated is arranged in the course of a flow duct. An optimal ventilation of the disk brake is achieved in that a control unit is provided which generates a ventilation signal as a function of input quantities. The signal is emitted to a device for the corresponding change of the flow cross-section of the flow duct.

14 Claims, 1 Drawing Sheet

ELECTRONICALLY CONTROLLED VENTILATION SYSTEM FOR A DISK BRAKE

BACKGROUND AND SUMMARY OF THE INVENTION

This application claims the priority of German Application No. 198 38 116.6, filed Aug. 21, 1998, the disclosure of which is expressly incorporated by reference herein.

The invention relates to an electronically controlled ventilation system for a disk brake, particularly in the case of a vehicle.

A brake ventilation system is basically known for use with disk brakes. Because of the high contact pressure forces in the case of disk brakes, high temperatures may occur locally which have a disadvantageous effect on the braking performance. To avoid this effect, a ventilation system can be provided, particularly for highly stressed disk brakes. Usually, bores are arranged in the brake disks. The bores are designed such that a ventilator effect occurs during the rotation of the disk. As a result of this measure, lower temperatures are reached during braking and faster cooling is achieved after the braking operation. The bores can also be used for the rapid displacement of moisture during braking and for reducing weight.

However, it was found that a maximal ventilation is not always accompanied by an optimal braking effect.

It is therefore an object of the invention to provide a ventilation system for a disk brake which permits optimal braking in any driving condition and in case of any brake load.

This object is achieved in the case of a ventilated disk brake, by a device for changing the flow cross-section in the course of a flow duct leading to the disk brake. This device is acted upon by a control unit. As a function of input quantities, the control unit generates a ventilation signal corresponding to the desired change of the flow cross-section.

The object is also achieved by a method for controlling the ventilation of a disk brake wherein the cross-section of a flow duct in which course the disk brake is arranged is changed as a function of one or more input quantities or parameters.

By changing the flow cross-section in the flow duct extending to the brake disk, a cooling can be ensured which is adapted to the respective driving condition and to the respective brake load.

A simple embodiment is characterized in that a ventilation flap is provided as the device for changing the flow cross-section in the flow duct. The ventilation flap is driven by a motor, particularly a torque motor or a transmission motor. The ventilation flap exposes the flow duct in the open condition, closes it in the closed condition and, by means of a rotation, permits any intermediate position between the above-mentioned extreme open and closed positions. Of course, instead of the ventilation flap any other device for changing the cross-section of the flow chart can be chosen.

As already mentioned, the ventilation flap can be driven in a particularly simple manner by an electric motor which is acted upon by the control unit. According to a specific embodiment, it should be ensured that the flow duct is open in the event of a system failure. This has the result of cooling the brakes in a currentless condition. The foregoing can be achieved by a spring element which acts upon the ventilation flap in an open condition.

The brake lining thickness, the brake lining temperature and/or the wear condition of the brake disk can be taken into account as input parameters. As an alternative, other input parameters or quantities can also be taken into account. These parameters can be measured either directly or be calculated from quantities existing in the vehicle. In addition, the above-mentioned quantities can be placed on and taken from the CAN bus.

Other objects, advantages and novel features of the present invention will become apparent from the following detailed description of the invention when considered in conjunction with the accompanying drawings.

DETAILED DESCRIPTION OF THE DRAWINGS

Figure 1:
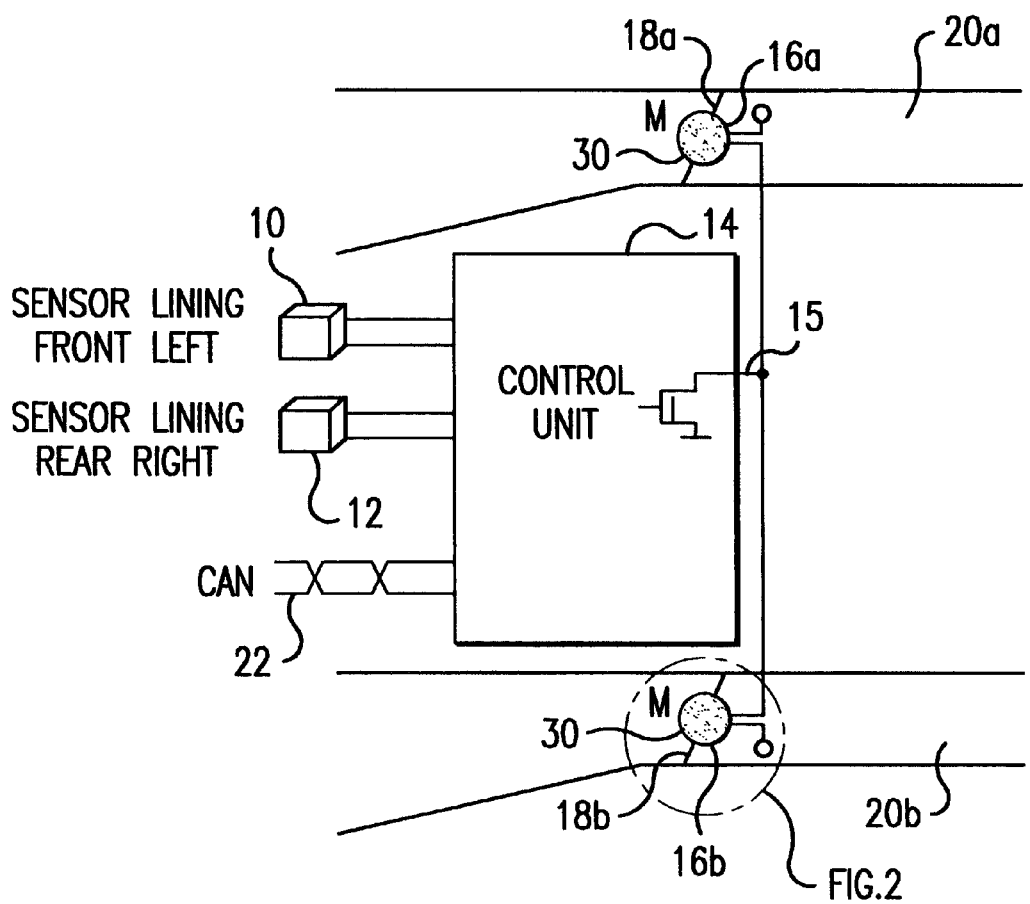
FIG. 1 is a schematic outline of an electronically controlled ventilation system according to the invention.
Figure 2:
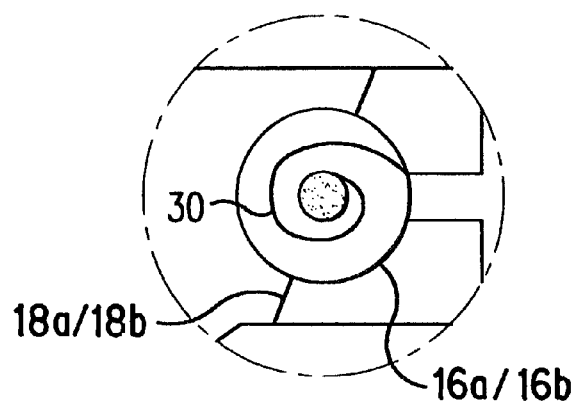
FIG. 2 is an enlarged view of a motor arranged in a flow duct according to the invention.

A control unit 14 is provided which, in the present case, receives certain input values (lining VL, lining HR) from analog sensors 10, 12 (sensor lining front left, sensor lining rear right). In the present case, this information concerns the brake lining on the left front and the right rear. On the basis of this information and other information present on and taken from a CAN bus 22, the control unit 14 computes the lining thickness, the lining temperature and the wear condition of the brake disk (not shown). From these quantities, the control unit 14 generates a ventilation signal which, by way of an output 15, is applied to a line leading to two electric motors 16a and 16b and acts upon it. The two motors 16a and 16b are arranged in corresponding ventilation ducts 20a and 20b which are fluidically connected with brake disks (not shown) to be ventilated. In the present case, the motors 16a and 16b are constructed as rotary actuators in the form of torque motors (as an alternative for example, they can be transmission motors). As shown in the enlarged view of FIG. 2, a spiral-shaped restoring spring 30 is arranged on each motor axis. Furthermore, also on the motor axis, a ventilation flap 18a, 18b is arranged which can be opened, closed or held in an intermediate condition by the operation of the motor. In the currentless condition (fail safe mode), the flap 18a, 18b is opened by way of the restoring spring 30.

If required for other applications, the "fail safe mode" can also be implemented inversely. The information concerning the momentary ventilation of the brake disks can also be taken from the CAN bus.

By means of an active-current monitoring of the driving circuit, electric interruptions can be recognized, for example, in the plug, in the cable, in the coil, etc.

On the whole, a ventilation control for a parameter-dependent ventilation of brake disks can be implemented at reasonable cost by means of the present invention. As a result, cooling is provided for the brake disks which is required for the optimal operability of the brakes.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An electronically controlled ventilation system for a disk brake, comprising:

a flow duct having a course and a cross-section;

a brake disk arranged in the course of the flow duct;

a device arranged in the flow duct for changing the cross-section of the flow duct; and a control unit coupled with said device and generating a ventilation signal as a function of at least one input signal, the ventilation signal being emitted to said device for changing the cross-section of the flow duct, wherein the device is positionable at any intermediate position between extreme open and closed positions.

2. The electronically controlled ventilation system according to claim 1, wherein said at least one input signal comprises at least one of a signal corresponding to a brake lining thickness, a brake lining temperature and a wear condition of the brake disk.

3. The electronically controlled ventilation system according to claim 1, further comprising one of a sensor for sensing the input signal and a calculator for calculating from one or more parameters the input signal.

4. The electronically controlled ventilation system according to claim 2, further comprising one of a sensor for sensing the input signal and a calculator for calculating from one or more parameters the input signal.

5. An electronically controlled ventilation system for a disk brake, comprising:

a flow duct having a course;

a brake disk arranged in the course of the flow duct;

a control unit which generates a ventilation signal as a function of at least one signal;

an actuator which is coupled to the control unit and which receives the ventilation signal from the control unit; and a flap which is arranged in the flow duct and which is connected to the actuator, said flap being positionable into any intermediate position between extreme and close positions in response to the ventilation signal so as to vary a cross-section of the flow duct.

6. The electronically controlled ventilation system according to claim 5, wherein the actuator is one of a torque motor and a transmission motor.

7. The electronically controlled ventilation system according to claim 5, further comprising a spring element coupled to the flap such that the flap is held open in a currentless condition of the actuator.

8. The electronically controlled ventilation system according to claim 5, wherein said at least one signal comprises at least one of a signal corresponding to a brake lining thickness, a brake lining temperature and a wear condition of the brake disk.

9. The electronically controlled ventilation system according to claim 7, further comprising one of a sensor for sensing the input signal and a calculator for calculating the input signal from one or more parameters.

10. A method for electronically controlling ventilation of a disk brake of a vehicle, the method comprising the acts of:

generating a control signal as a function of at least one input parameter; and changing a cross-section of a flow duct having a flow course so as to allow for various cross-sections between an extreme open flow duct cross-section and a closed flow duct cross-section in which a brake disk is arranged based on said control signal.

11. The method according to claim 10, further comprising the act of:

opening the cross-section of the flow duct in the event an actuator, the operation of which determines the cross-section, is in a currentless condition.

12. The method according to claim 10, further comprising the act of:

choosing at least one of a brake lining thickness, a brake lining temperature and a wear condition of the brake disk as said at least one input parameter.

13. The method according to claim 10, further comprising the acts of:

sensing said at least one input parameter directly; or calculating said at least one input parameter from other parameters.

14. The method according to claim 12, further comprising the acts of:

sensing said at least one input parameter directly; or calculating said at least one input parameter from other parameters.

* * * * *